(12) United States Patent
Donnadieu et al.

(10) Patent No.: US 8,455,116 B2
(45) Date of Patent: *Jun. 4, 2013

(54) COATED CEMENTED CARBIDE CUTTING TOOL INSERT

(75) Inventors: Pierre Donnadieu, Luynes (FR); Susanne Norgren, Huddinge (SE)

(73) Assignee: Sandvik Intellectual Property AB, Sandviken (SE)

( * ) Notice: Subject to any disclaimer, the term of this patent is extended or adjusted under 35 U.S.C. 154(b) by 430 days.

This patent is subject to a terminal disclaimer.

(21) Appl. No.: 12/128,803

(22) Filed: May 29, 2008

(65) Prior Publication Data

US 2008/0295658 A1 Dec. 4, 2008

(30) Foreign Application Priority Data

Jun. 1, 2007 (SE) .................................... 0701320
Feb. 18, 2008 (SE) .................................... 0800367

(51) Int. Cl.
*B32B 9/00* (2006.01)

(52) U.S. Cl.
USPC ............... 428/697; 51/307; 51/309; 428/216; 428/336; 428/472; 428/698; 428/699

(58) Field of Classification Search
USPC .................... 51/307, 309; 428/216, 336, 469, 428/472, 697, 698, 699; 75/240
See application file for complete search history.

(56) References Cited

U.S. PATENT DOCUMENTS

| | | | |
|---|---|---|---|
| 5,679,448 A * | 10/1997 | Kawata ........................ | 428/697 |
| 5,761,593 A | 6/1998 | Ostlund et al. .................. | 419/29 |
| 6,103,357 A * | 8/2000 | Selinder et al. ................. | 51/307 |
| 6,214,287 B1 | 4/2001 | Waldenström | |
| 6,250,855 B1 * | 6/2001 | Persson et al. .................. | 51/309 |
| 6,261,673 B1 | 7/2001 | Reineck et al. | |
| 6,273,930 B1 * | 8/2001 | Waldenstrom .................. | 75/240 |
| 6,309,738 B1 | 10/2001 | Sakurai ......................... | 428/216 |
| 6,342,291 B1 * | 1/2002 | Jonsson et al. ................. | 428/699 |
| 6,413,293 B1 * | 7/2002 | Grearson et al. ................ | 75/240 |
| 6,575,671 B1 | 6/2003 | North et al. .................... | 407/119 |
| 6,612,787 B1 | 9/2003 | North et al. | |
| 6,884,499 B2 * | 4/2005 | Penich et al. ................... | 428/699 |
| 7,179,319 B2 | 2/2007 | Heinrich et al. ................ | 75/236 |
| 7,727,621 B2 * | 6/2010 | Nordlof et al. ................. | 428/216 |
| 2002/0051887 A1 | 5/2002 | Jonsson et al. | |
| 2005/0072269 A1 | 4/2005 | Banerjee | |
| 2006/0029511 A1 | 2/2006 | Gustafson et al. | |
| 2006/0286410 A1 * | 12/2006 | Ahlgren et al. ................ | 428/698 |
| 2007/0154739 A1 * | 7/2007 | Martensson et al. .......... | 428/698 |
| 2007/0292671 A1 | 12/2007 | Akesson et al. | |
| 2008/0276544 A1 | 11/2008 | Hirose et al. | |

FOREIGN PATENT DOCUMENTS

| | | |
|---|---|---|
| DE | 101 35 790 B4 | 7/2005 |
| EP | 0 773 080 A1 | 10/1996 |
| EP | 1 038 989 B1 | 9/2000 |
| EP | 1 347 076 B1 | 9/2003 |
| EP | 1 470 879 A1 | 10/2004 |
| EP | 1 526 189 A1 | 4/2005 |
| EP | 1 749 601 A1 | 6/2006 |
| EP | 1 676 939 A1 | 7/2006 |
| EP | 1 043 413 B1 | 9/2006 |
| EP | 1 795 628 A1 | 6/2007 |
| EP | 1 798 308 A2 | 6/2007 |
| EP | 1 798 310 A2 | 6/2007 |
| EP | 1 803 830 A1 | 7/2007 |
| EP | 1 500 713 B1 | 8/2007 |
| EP | 1 900 849 A1 | 3/2008 |
| GB | 1 593 326 | 7/1981 |
| JP | 7-97679 | 4/1995 |
| JP | 8-209333 | 8/1996 |
| JP | 10-324942 * | 8/1998 |
| JP | 10-324943 * | 8/1998 |
| JP | 11-12718 A | 1/1999 |
| JP | 11152535 A | 6/1999 |
| JP | 2000-23320 | 8/2000 |
| JP | 2001-329360 A | 11/2001 |
| JP | 2003193171 (A) | 7/2003 |
| JP | 2004-315904 | 11/2004 |
| JP | 2004-315904 A | 11/2004 |
| JP | 2006-117974 | 5/2006 |
| JP | 2007-44807 | 2/2007 |
| JP | 2008-1918 | 1/2008 |
| JP | 2009-61579 | 3/2009 |

(Continued)

OTHER PUBLICATIONS

Hsieh et al "Deposition and characterization of TiAlN and multilayered TiN/TiAlN coatings using unbalanced magnetron sputtering" Surface & Coatings Technology 108-109 (1998) p. 132-137.*
Anderson et al "Deposition, microstructure and mechanical and tribological properties of magnetron sputtered TiN/TiAlN multilayers" Surface & Coatings Technology 123 (2000) p. 219-226.*
European Search Report dated Nov. 12, 2008 issued in European Application No. 08157076.4.
Office Action mailed Sep. 3, 2010, in U.S. Appl. No. 12/129,963.
Office Action mailed Aug. 13, 2010, in U.S. Appl. No. 12/147,587.
Office Action mailed Aug. 13, 2010, in U.S. Appl. No. 12/126,195.
European Search Report dated Nov. 13, 2008, issued in EP 08 10 4014.
European Search Report dated Nov. 11, 2008, issued in EP 08 15 6044.

(Continued)

*Primary Examiner* — Archene Turner
(74) *Attorney, Agent, or Firm* — Morgan, Lewis & Bockius LLP

(57) ABSTRACT

The present invention relates to PVD coated cemented carbide cutting tool inserts semifinishing and finishing metal cutting operations. The cemented carbide cutting tool insert comprises a substrate and a wear resistant coating. The substrate comprises in addition to WC, from about 5.5 to about 8.5 wt-% Co and Cr such that the Cr/Co weight ratio is from about 0.08 to about 0.12 and also small amounts of Ti and Ta. The wear resistant coating is a homogeneous $Al_xTi_{1-x}N$-layer with x equals from about 0.6 to about 0.67. The thickness of this layer is from about 1 to about 3.8 µm.

3 Claims, No Drawings

FOREIGN PATENT DOCUMENTS

| | | |
|---|---|---|
| JP | 2009-66747 | 4/2009 |
| WO | WO 97/20082 | 6/1997 |
| WO | WO 99/13120 | 3/1999 |
| WO | WO 2006/041366 A1 | 4/2006 |
| WO | WO 2006/043421 A1 | 4/2006 |
| WO | WO 2006/080888 A1 | 8/2006 |

OTHER PUBLICATIONS

European Search Report dated Nov. 12, 2008, issued in EP 08 15 7076.
European Search Report dated Nov. 12, 2008, issued in EP 08 15 6057.
International Search Report dated Oct. 3, 2008, issued in PCT/SE2008/050777.
Swedish Office Action mailed Jul. 12, 2007, issued in 0701449-1.
S. Liu, "Magnetic Property of Binder in WC-Co Cemented Carbides", Transactions of NFsoc, vol. 2, No. 3, (Aug. 1992), pp. 83-86.
B. Roebuck, "Magnetic Moment (Saturation) Measurements on Hardmetals", Int. J. of Refractory Metals & Hard Materials 14(1996), 419-424.
Notice of Opposition against EP 2 011 890, dated Jul. 13, 2011.
Notice of Opposition against EP 2006413, dated Jul. 18, 2011.
Kolaska, Hans, "Pulvermetallurgie der Hartmetalle", Hagen: Fachverband Pulvermetallurgie, 1992.
Letter from Opponent in Opposition against EP2006413, dated Jul. 16, 2012.
Letter from Opponent in Opposition against EP2011890, dated Mar. 13, 2012.
Reply from Proprietor in Opposition against EP2006413, dated Feb. 28, 2012.
Reply from Proprietor in Opposition against EP2011890, dated Feb. 20, 2012.

* cited by examiner

COATED CEMENTED CARBIDE CUTTING TOOL INSERT

CROSS-REFERENCE TO PRIOR APPLICATION

This application claims priority to Swedish Patent Application No. 0701320-4 filed Jun. 1, 2007 and Swedish Patent Application No. 0800367-5 filed Feb. 18, 2008, which is incorporated by reference herein.

BACKGROUND OF THE INVENTION

The present invention relates to a coated cemented carbide cutting tool insert. More specifically the invention relates to PVD coated cemented carbide cutting tool inserts for semifinishing or finishing metal cutting operations.

High performance cutting tools must possess high wear resistance, high toughness properties and good resistance to plastic deformation. This is particularly valid when the cutting operation is carried out at high cutting speeds and/or at high feed rates when large amount of heat is generated.

Cemented carbide grades for metal machining applications generally contain WC, γ-phase, which is a solid solution of generally TiC, NbC, TaC and WC, and a binder phase, generally Co and/or Ni. WC—Co cemented carbides having a fine grain size less than about 1 μm are produced through the incorporation of grain growth inhibitors such as V, Cr, Ti, Ta and combinations thereof in the initial powder blend. Typical inhibitor additions are from about 0.5 to about 5 wt-% of the binder phase.

OBJECTS AND SUMMARY OF THE INVENTION

It is an object of the present invention to provide inserts with a coated cemented carbide with improved wear resistance without sacrificing toughness and edge security, particularly useful for semifinishing or finishing operations of metal materials.

This object is solved by providing a cemented carbide insert of a WC+Co— substrate with fine grain size provided with a PVD coating.

In one aspect of the present invention, there is provided a cemented carbide cutting tool insert comprising a substrate and a wear resistant coating wherein the substrate comprises WC, from about 5.5 to about 8.5 wt-% Co and Cr such that the Cr/Co weight ratio is from about 0.08 to about 0.12, and also Ti and Ta in such amounts that the ratio of Me/Co=(at % Ti+at % Ta)/at % Co is less than or equal to about 0.014−(CW—Cr)*0.008 and higher than about 0.0005 and CW—Cr is from about 0.75 to about 0.95, whereby the CW—Cr is defined as CW—Cr=(magnetic-% Co+1.13*wt-% Cr)/wt-% Co where magnetic-% Co is the weight percentage of magnetic Co and wt-% Co is the weight percentage of Co in the cemented carbide, the coercivity is more than about 20 kA/m, and the wear resistant coating is a homogeneous $Al_xTi_{1-x}N$-layer where x equals from about 0.6 to about 0.67, with thickness of more than about 1 μm, but less than about 3.8 μm, both composition and thickness being measured on the flank face about 0.2 mm below the nose radius and in the center of the cutting edge.

In another aspect of the present invention, there is provided a method of making a cemented carbide cutting tool insert comprising a substrate and a wear resistant coating comprising the following steps: providing a substrate comprising WC, from about 5.5 to about 8.5, wt-% Co and Cr such that the Cr/Co weight ratio is 0.08-0.12 and also Ti and Ta in such amounts that the ratio of Me/Co=(at % Ti+at % Ta)/at % Co is less than or equal to about 0.014−(CW—Cr)*0.008 and higher than about 0.0005 and the CW—Cr is from about 0.75 to about 0.95, where the CW—Cr is defined as CW—Cr= (magnetic-% Co+1.13*wt-% Cr)/wt-% Co where magnetic-% Co is the weight percentage of magnetic Co and wt-% Co is the weight percentage of Co in the cemented carbide and the coercivity is more than about 20 kA/m by: wet milling submicron powders of tungsten carbide, cobalt, Ti and Ta added as TiC, TaC, (Ti,W)C, (Ta,W)C or (Ti,Ta,W)C and at least one of $Cr_3C_2$, $Cr_{23}C_6$ and $Cr_7C_3$ to obtain a slurry, drying the slurry to obtain a powder, pressing the powder to inserts, sintering the inserts in vacuum, possibly performing an isostatic gas pressure step during sintering temperature or at the final stage of sintering, possibly grinding the inserts to requested shapes, depositing by arc evaporation technique whilst maintaining a partial pressure of nitrogen in the recipient and using the appropriate selection of active evaporation sources and rates, a wear resistant coating comprising a homogeneous $Al_xTi_{1-x}N$-layer with x equals from about 0.6 to about 0.67, and a thickness of the layer of more than about 1 μm, but less than about 3.8 μm, the composition and the thickness being measured on the flank face about 0.2 mm below the nose radius and in the center of the cutting edge.

Still further aspects of the invention relate to the uses of the cemented carbide cutting tool insert described above in certain milling and turning operations.

DETAILED DESCRIPTION OF THE PREFERRED EMBODIMENTS

According to the present invention, there is provided coated cemented carbide shaped inserts for semifinishing or finishing machining of metals, comprising a cemented carbide substrate, a wear resistant coating, and different insert geometries. The substrate comprises in addition to WC from about 5.5 to about 8.5, preferably from about 6 to about 8, wt-% Co and Cr such that the Cr/Co weight ratio is from about 0.08 to about 0. 12, preferably from about 0.09 to about 0.11. The substrate also contains Ti and Ta in such amounts that the ratio Me/Co=(at % Ti+at % Ta)/at % Co is less than or equal to about 0.014−(CW—Cr)*0.008 and higher than 0.0005, preferably higher than about 0.0007 and the CW—Cr ratio is from about 0.75 to about 0.95, preferably from about 0.78 to about 0.93, where CW—Cr=(magnetic-% Co+1.13*wt-% Cr)/wt-% Co where magnetic-% Co is the weight percentage of magnetic Co and wt-% Co is the weight percentage of Co in the cemented carbide. The CW—Cr ratio is a function of the W content in the Co binder phase. A CW—Cr of about 1 corresponds to a low W-content in the binder phase and a CW—Cr of from about 0.75 to about 0.8 corresponds to a high W-content in the binder phase.

The coercivity is more than about 20 kA/m, preferably from about 23 to about 29 kA/m.

The sintered body may also contain small amounts of precipitations of additional phase or phases such as eta-phase, MX or $M_7X_3$, $M_3X_2$ where M=(Ti+Ta+Co+Cr+W) and X=C or N allowed to a maximum of 5.0 vol % without detrimental effects.

The wear resistant coating comprises a homogeneous $Al_xTi_{1-x}N$-layer with x equals from about 0.6 to about 0.67, preferably x equals about 0.62. The thickness of the layer is more than about 1 μm, preferably more than about 1.8 μm but less than about 3.8 μm, preferably less than about 3.0 μm. Both the composition and the thickness are measured on the flank face of the insert from about 0.2 mm below the nose radius and in the center of the cutting edge.

The present invention also relates to a method of making cemented carbide cutting tool inserts for semifinishing or finishing operations in milling applications, comprising the following steps:

providing a cemented carbide substrate with a composition according to above by:
  wet milling submicron powders of tungsten carbide, cobalt, Ti and Ta added as TiC, TaC, (Ti,W)C, (Ta,W)C or (Ti,Ta,W)C and at least one of $Cr_3C_2$, $Cr_{23}C_6$ and $Cr_7C_3$ to obtain a slurry,
  drying the slurry to obtain a powder,
  pressing the powder to inserts,
  sintering the inserts in vacuum,
  possibly performing an isostatic gas pressure step during sintering temperature or at the final stage of sintering
  possibly grinding the inserts to desired shapes
  depositing by arc evaporation technique whilst maintaining a partial pressure of nitrogen in the recipient, and using the appropriate selection of active evaporation sources and rates, a wear resistant coating comprising a homogeneous $Al_xTi_{1-x}N$-layer with x equals from about 0.6 to about 0.67, preferably x equals about 0.62. The thickness of the layer is more than about 1 μm, preferably more than about 1.8 μm but less than about 3.8 μm, preferably less than about 3.0 μm, the composition and the thickness being measured on the flank face from about 0.2 mm below the nose radius and in the center of the cutting edge.

A first embodiment the present invention relates to the use of inserts according to above for die and mold semifinishing and finishing operations in milling applications of work pieces with a hardness of from about 30 to about 65 HRC.

A second embodiment the present invention relates to the use of inserts according to above for machining of heat resistant super alloys (HRSA), as Inconel 718, Inconel 625, Waspaloy or Udimet 720,
  at cutting speeds of from about 20 to about 180 m/min, feed rates of from about 0.05 to about 0.3 mm/rev and depth of cut of from about 0.2 to about 0.6 mm in turning applications and
  at cutting speeds of from about 15 to about 180 m/min, tooth feed of from about 0.05 to about 0.2 mm/tooth and axial depth of cut of from about 0.25 to about 7 mm in milling applications.

A third embodiment the present invention relates to the use of inserts according to above for machining of stainless steel, such as AISI/SAE 304, San-Mac 316L, SAF2205 or SAF2507,
  at cutting speeds of from about 7 to about 200 m/min, feed rates of from about 0.1 to about 0.4 mm/rev and depth of cut of from about 0.3 to about 2.5 mm in turning applications and
  at cutting speeds of from about 60 to about 200 m/min, tooth feed of from about 0.05 to about 0.2 mm/tooth and axial depth of cut of from about 0.5 to about 2.5 mm in milling applications.

A fourth embodiment the present invention relates to the use of inserts according to above for milling of tool steel at a cutting speed from about 70 up to about 120 m/min, a feed from about 0.1 to about 0.35 mm/tooth and depth of cut from about 1 to about 3 mm.

A fifth embodiment the present invention relates to the use of inserts according to above for turning of hardened steel, at a cutting speed from about 40 up to about 60 m/min and a feed from about 0.03 to about 0.05 mm/rev and depth of cut from about 0.2 to about 0.5 mm.

A sixth embodiment the present invention relates to the use of inserts according to above for milling of hard cast steel, at a cutting speed from about 50 up to about 100 m/min and a feed from about 0.1 to about 0.3 mm/tooth and depth of cut from about 0.50 to about 1.5 mm.

A seventh embodiment the present invention relates to the use of inserts according to above for machining of cast iron,
  at cutting speeds of from about 200 to about 400 m/min, feed rates of from about 0.1 to about 0.5 mm/rev and depth of cut of from about 0.5 to about 4 mm in turning applications and
  at cutting speeds of from about 150 to about 350 m/min, tooth feed of from about 0.05 to about 0.3 mm/tooth and axial depth of cut of from about 0.05 to about 2.5 mm in milling applications.

The invention is additionally illustrated in connection with the following examples, which are to be considered as illustrative of the present invention. It should be understood, however, that the invention is not limited to the specific details of the examples.

EXAMPLE 1

Tungsten carbide powder, 7 wt % very fine grained cobalt powder and 0.7 wt-% Cr added as H. C. Starck fine grained $Cr_3C_2$-powder, 0.014 wt-% Ti and 0.010 wt-% Ta, added as TiC and TaC, were wet milled together with conventional pressing agents. After milling and spray drying, the powder was pressed to shape blanks for inserts and sintered at 1410° C. The sintered material had a coercivity of 27 kA/m corresponding to a WC grain size of about 0.8-0.9 μm. Substrate data are summarized in the table below.

|  | W % Ti | W % Ta | Me/Co | W % Co | W % Cr | W % Cr/w % Co | CW—Cr | 0.014-(CW—Cr)*0.008 |
|---|---|---|---|---|---|---|---|---|
| Substrate data | 0.014 | 0.010 | 0.0029 | 7.00 | 0.70 | 0.10 | 0.85 | 0.0062 |

The so obtained cemented carbide inserts were ground to obtain the finished shapes.

The as-ground inserts were wet cleaned. A homogeneous (Ti,Al)N layer was deposited by cathodic arc evaporation using a target material consisting of a $Ti_{0.33}Al_{0.67}$ alloy in an $N_2$ gas atmosphere. The thickness of the layer was 2.5 μm and was a homogeneous layer with the composition $Al_{0.62}Ti_{0.38}N$ as determined by EDS-analysis.

EXAMPLE 2

Inserts from Example 1 were tested and compared with inserts of a commercially available market reference (grade, coating, shape) for the intended application area. Wear resistance test was done.

The test represents the upper range in terms of work piece hardness.

Type of Test

A die and mold application, a straight shaped mold with the cutter body in the orthogonal milling position.

| | |
|---|---|
| Machine: | Deckel Maho, DMU60T |
| Work piece steel | DIN 1.2320, HRC 62 |
| Cutting speed, $V_c$ (m/min) | 70 |
| Insert ref: | PPH1600CL1 |
| Tooth feed, $f_z$, (mm/tooth) | 0.36 |
| Depth of cut, Axial/Radial(mm) | 0.25/0.3 |
| Ø effective | 3.40 mm = constant |
| Cooling | Dry |
| Tool life criterion | Max flank wear 0.15 mm |
| Result: | Tool life |
| Invention (from Example 1) | 100 min (flank wear = 0.12 mm) |
| Commercial reference leader | 45 min (flank wear = 0.15 mm) |

There is a significant improvement in comparison to the commercial reference which is optimised for this range of work piece hardness. This clearly expresses the superior wear resistance of the invented tool. The commercial tool failed to meet the demanded tool life, whereas the invented tool had a superior tool life with better cutting edge integrity.

EXAMPLE 3

Inserts from Example 1 were tested and compared with inserts of a commercially available reference (grade, coating, shape) for the intended application area. This is a toughness demanding test in die and mold application before tempering the material. The machining situation was a very typical application. It represents, in terms of work piece hardness, the lower end of the application area in die and mold applications.

Type of Test

Semifinishing a cavity, with the cutter body orthogonally oriented to the bottom surface of the mold

| | |
|---|---|
| Work piece steel | DIN 1.2343 at 32 HRC |
| Cutting speed, Vc (m/min) | 196 |
| Insert ref: | RDHW12T3MOENF6-91 |
| Tooth feed, fz, mm/tooth | 1 |
| Depth of cut, Axial/Radial (mm) | 1/35 |
| Cooling | dry |
| Tool life criterion | cutting time |
| Result: | |
| Invention (from Example 1) | 135 min |
| Commercial reference | 120 min |

The improvement compared to the commercial reference, which is fully designed for semi-finishing machining in this application, shows the excellent comportment of the invented tool.

EXAMPLE 4

Inserts from Example 1 were tested and compared with inserts of a commercially available market reference (grade, coating, shape) for Milling-Finishing of heat resistant super alloys (HRSA).

| Test 1 | |
|---|---|
| Machine: | AXA VSC50 |
| Work piece: | INCONEL 718 |
| Cutting speed Vc (m/min) | 20 |
| Milling cutter reference | RT10032005QWC32050R |
| Insert ref: | RT100304R11 |
| Tooth feed, fz (mm/tooth) | 0.1 |
| Depth of cut Axial/Radial (mm) | 2/20 |
| Coolant: | Emulsion 6% |
| Tool life criterion | cutting time 22 min |

Result invention vs commercial reference leader
flank wear invention=0.04 mm
flank wear commercial ref=0.4 mm

| Test 2 | |
|---|---|
| Machine: | DMG DMU60T |
| Work piece: | UNS R 31537 (Co = 28%; Cr = 6%) |
| Cutting speed Vc (m/min) | 20 |
| Milling cutter diameter | RT1002003QWC20030R |
| Insert ref: | RT100304R11 |
| Tooth feed, fz (mm/tooth) | 0.1 |
| Depth of cut Axial/Radial (mm) | 7/10 |
| Coolant: | Emulsion |

Result invention vs commercial reference leader
flank wear invention=0.05 mm (cutting time 11 min)
flank wear commercial ref=0.35 mm (cutting time 11 min)

EXAMPLE 5

Inserts from Example 1 were tested and compared with inserts of a commercially available market reference (grade, coating, shape) for Milling-Finishing of Stainless Steel

| Test 1 | |
|---|---|
| Machine: | CU HURCO VMX80 |
| Work piece: | 304L |
| Cutting speed Vc (m/min) | 200 |
| Milling cutter reference | RT1002504CMC3040R |
| Insert ref: | RT10T3C5ER81 |
| Tooth feed, fz (mm/tooth) | 0.1 |
| Depth of cut Axial/Radial (mm) | 2/12 |
| Coolant: | Dry |

Tool life criterion cutting time 12 min
Result invention vs commercial reference leader
Flank wear invention=0.04 mm
flank wear commercial ref=0.1 mm

| Test 2 | |
|---|---|
| Machine: | DMG DMU60T |
| Work piece: | 304L |
| Cutting speed Vc (m/min) | 150 |
| Milling cutter reference | RT1002003QWC20030R |
| Insert ref: | RT100304R11 |
| Tooth feed, fz (mm/tooth) | 0.07 |
| Depth of cut Axial/Radial (mm) | 2/15 |
| Coolant: | dry |

Result invention vs commercial reference leader
flank wear invention=0.05 mm (cutting time 12 min)
flank wear commercial ref=0.8 mm (cutting time 4 min)

EXAMPLE 6

Inserts from Example 1 were tested and compared with inserts of a commercially available market reference (grade, coating, shape) for Milling-Finishing of Cast Iron

| Test 1 | |
|---|---|
| Machine: | LINEA |
| Work piece: | DIN 0.6030 |
| Cutting speed Vc (m/min) | 250 |
| Milling cutter ref = | NN85-12/125-24-AL40-063 |
| Insert ref: | SNHF1204FN-EN11ET |
| Tooth feed, fz (mm/tooth) | 0.05 |
| Depth of cut Axial/Radial (mm) | 0.07/175 |

Coolant: Emulsion
Result invention vs commercial reference leader=Increase in tool life by 30%

| Test 2 | |
|---|---|
| Machine: | HERMLE U 1130 |
| Work piece: | DIN 0.7040 |
| Cutting speed Vc (m/min) | 300 |
| Milling cutter diameter | Ø160 |
| Insert ref: | TPKN1603PDSR2C |
| Tooth feed, fz (mm/tooth) = | 0.1 |
| Depth of cut Axial/Radial(mm) | 0.05/100 |
| Coolant: | Emulsion |

EXAMPLE 7

Inserts from Example 1 were tested and compared with inserts of a commercially available market reference (grade, coating, shape) for Milling-Finishing of hard cast steel

| Test 1 | |
|---|---|
| Machine: | AXA VSC 50 |
| Work piece steel: | Austenitic steel with Carbides, C = 1.15 (Hardness 55HRc) |
| Cutting speed Vc (m/min) | 80 |
| Milling cutter diameter | Ø130 |
| Insert ref: | SPEN120408 |
| Tooth feed, fz (mm/tooth) | 0.2 |
| Depth of cut Axial/Radial (mm) | 1.5/25 |
| Coolant: | dry |

Result invention vs commercial reference leader improvement of 20% in tool life

| Test 2 | |
|---|---|
| Machine: | DMG DMU60T |
| Work piece steel: | DIN 1.2739 (60 HRc) |
| Cutting speed Vc (m/min) | 65 |
| Milling cutter reference | RT1003205QWC32050R |
| Insert ref: | RT10T3C5R81 |
| Tooth feed, fz (mm/tooth) | 0.1 |
| Depth of cut Axial/Radial (mm) | 1/10 |
| Coolant: | Dry |

Result invention vs commercial reference leader
flank wear invention=0.2 mm
flank wear commercial ref=0.35 mm

EXAMPLE 8

Inserts from Example 1 were tested and compared with inserts of a commercially available market reference (grade, coating, shape) for Milling Semi Finishing & Light Roughing of tool steel

| Test 1 | |
|---|---|
| Machine: | Line C3N 2 FR |
| Work piece steel: | DIN 1.3401 |
| Cutting speed Vc (m/min) | 80 |
| Milling cutter diameter | Ø130 |
| Insert ref: | SPEN120408 |
| Tooth feed, fz (mm/tooth) | 0.3 |
| Depth of cut Axial/Radial (mm) | 2/10 |
| Coolant: | dry |

Result invention vs commercial reference leader improvement of 30% in tool life

| Test 2 | |
|---|---|
| Machine: | AXA VSC50 |
| Work piece steel: | 1.2340 |
| Cutting speed Vc (m/min) | 100 |
| Milling cutter reference | RT1003205QWC32050R |
| Insert ref: | RT10T3C5R81 |
| Tooth feed, fz (mm/tooth) | 0.15 |
| Depth of cut Axial/Radial (mm) | 2/25 |
| Coolant: | Dry |

Result invention vs commercial reference leader
flank wear invention=0.1 mm (9 parts machined)
flank wear commercial ref=0.4 mm (1 part machined)

EXAMPLE 9

Inserts from Example 1 were tested and compared with inserts of a commercially available market reference (grade, coating, shape) for Milling-SemiFinishing & Light Roughing of HRSA

| Test 1 | |
|---|---|
| Machine: | Milling Center |
| Work piece: | 2.4375 |
| Cutting speed Vc (m/min) | 100 |
| Milling cutter reference | PPH16/02-QW16-032 |
| Insert ref: | PPH1600CL1 |
| Tooth feed, fz (mm/tooth) | 0.1 |
| Depth of cut Axial/Radial (mm) | 0.25/0.25 |
| Coolant: | Emulsion |
| Tool life criterion | 5 parts |

Result invention vs commercial reference leader flank wear invention=0.06 mm flank wear commercial ref=0.3 mm

| Test 2 | |
|---|---|
| Machine: | CU Correa |
| Work piece: | STELLITE 21 |
| Cutting speed Vc (m/min) | 180 |
| Milling cutter diameter | PPH32/02-QC32-186 |
| Insert ref: | PPH3200CL1 |
| Tooth feed. fz (mm/tooth) | 0.16 |
| Depth of cut Axial/Radial (mm) | 1/1.6 |
| Coolant: | Yes |

Result invention vs commercial reference leader cutting speed increased by 50%

EXAMPLE 10

Inserts from Example 1 were tested and compared with inserts of a commercially available market reference (grade, coating, shape) for Milling-Semi Finishing and Light Roughing of Stainless Steel

| Test 1 | |
|---|---|
| Machine: | CU HURCO VMX80 |
| Work piece: | 304L |
| Cutting speed Vc (m/min) | 120 |
| Milling cutter reference | RT1002504CMC3040R |
| Insert ref: | RT10T3C5ER81 |
| Tooth feed, fz (mm/tooth) | 0.15 |
| Depth of cut Axial/Radial (mm) | 2/10 |
| Coolant: | Dry |
| Tool life criterion | cutting time 5 min |

Result invention vs commercial reference leader flank wear invention=0.08 mm flank wear commercial ref=0.12 mm

| Test 2 | |
|---|---|
| Machine: | PCI Meteor 10 |
| Work piece: | 304L |
| Cutting speed Vc (m/min) | 150 |
| Milling cutter reference | RT1002003QWC20030R |
| Insert ref: | RT100308R31 |
| Tooth feed, fz (mm/tooth) | 0.1 |
| Depth of cut Axial/Radial (mm) | 2/15 |
| Coolant: | Yes |
| Tool life criterion | Max flank wear 0.3 mm |

Result invention vs commercial reference leader

Tool life multiplied by 3 with the invention

EXAMPLE 11

Inserts from Example 1 were tested and compared with inserts of a commercially available market reference (grade, coating, shape) for Milling-Semi Finishing and Light Roughing of Cast Iron

| Test 1 | |
|---|---|
| Machine: | MAZAK VTC-20C |
| Work piece: | DIN 0.7040 |
| Cutting speed Vc (m/min) = | 177 |
| Milling cutter reference = | PS09/125-08-AL40-063R |
| Insert ref: | PDMT0905DESR-91 |
| Tooth feed, fz (mm/tooth) = | 0.28 |
| Depth of cut Axial/Radial (mm) | 1/50 |
| Coolant: | Emulsion |

Tool life criterion

Result invention vs commercial reference leader

Flank wear invention=0.1 mm flank wear commercial ref=0.3 mm

| Test 2 | |
|---|---|
| Machine: | Deckel Maho |
| Work piece: | EN-GJS-400-18-LT |
| Cutting speed Vc (m/min) | 200 |
| Milling cutter diameter | Ø125 |
| Insert ref: | SEKR1203AFEN41 |
| Tooth feed, fz (mm/tooth) | 0.25 |
| Depth of cut Axial/Radial (mm) | 1.5/100 |
| Coolant: | Emulsion |

EXAMPLE 12

Inserts from Example 1 were tested and compared with inserts of a commercially available market reference (grade, coating, shape) for Turning-Finishing of hardened Steel

| Test 1 | |
|---|---|
| Machine: | SOMAB Unimab 500 |
| Work piece steel: | M2 (DIN 1.1003) Hv = 65 |
| Cutting speed Vc (m/min) | 50 |
| Insert ref: | DNMA150604 |
| Feed rate, (mm/rev) | 0.05 |
| Depth of cut, ap (mm) | 0.25 |
| Coolant: | Emulsion |
| Tool life criterion | 1 part |

Result invention vs commercial reference leader flank wear invention=0.11 mm flank wear commercial ref=0.21 mm

| Test 2 | |
|---|---|
| Machine: | SOMAB Unimab 500 |
| Work piece steel: | M2 (DIN 1.1003) Hv = 65 |
| Cutting speed Vc (m/min) | 40 |
| insert ref: | TCGT0902022M |
| Feed rate, (mm/rev) | 0.04 |
| Depth of cut, ap (mm) | 0.5 |
| Coolant: | Emulsion |
| Tool life criterion | Max flank wear = 0.1 mm |

Result invention vs commercial reference leader

Tool life invention=9 min

Tool life commercial reference leader=3 min (CERMET)

EXAMPLE 13

Inserts from Example 1 were tested and compared with inserts of a commercially available market reference (grade, coating, shape) for Turning-Finishing of Cast Iron

| Test 1 | |
|---|---|
| Machine: | FAMAR |
| Work piece: | FGL200 (NFA32011) |
| Cutting speed Vc (m/min) = | 300 |
| insert ref: | CCMT09T30433 |
| Feed rate, (mm/rev) | 0.16 |
| Depth of cut, ap (mm) | 1 to 2 |
| Coolant: | Emulsion |

Result invention vs commercial reference leader=Tool life increased by 50%

| Test 2 | |
|---|---|
| Machine: | Mori Seiki |
| Work piece: | GL300 (EN-GJL-300) |
| Cutting speed Vc (m/min) = | 300 |
| Insert ref: | CNMA120412 |
| Feed rate, (mm/rev) | 0.15 |
| Depth of cut, ap (mm) | 0.5 |
| Coolant: | Emulsion |

Result invention vs commercial reference leader=Tool life increased by 30%

EXAMPLE 14

Inserts from Example 1 were tested and compared with inserts of a commercially available market reference (grade, coating, shape) for Turning-Semi finishing & Light Roughing of hardened steel

| Test 1 | |
|---|---|
| Machine: | GILDEMEISTER |
| Work piece steel: | DIN 1.7228 (55HRC) |
| Cutting speed Vc (m/min) = | 80 |
| Insert ref: | WNMA080408 |
| Feed rate, (mm/rev) | 0.1 |
| Depth of cut, ap (mm) | 2 |
| Coolant: | Emulsion |

Result invention vs commercial reference leader
flank wear invention=0.25 mm
flank wear commercial ref=0.5 mm

| Test 2 | |
|---|---|
| Machine: | Mori Seiki |
| Work piece steel: | DIN 1.2739 (60 HRC) |
| Cutting speed Vc (m/min) = | 70 |
| Insert ref: | CNGA120408 |
| Feed rate, (mm/rev) | 0.08 |
| Depth of cut, ap (mm) | 0.5 |
| Coolant: | Emulsion |

Result invention vs commercial reference leader=Tool life increased by 30%

EXAMPLE 15

Inserts from Example 1 were tested and compared with inserts of a commercially available market reference (grade, coating, shape) for Turning semi-Finishing of HRSA

| Test 1 | |
|---|---|
| Machine: | MORANDO 80HP |
| Work piece steel: | INCONEL 706 |
| Cutting speed Vc (m/min) | 65 |
| Insert ref: | CNMG120412M2 |
| Feed rate, (mm/rev) | 0.25 |
| Depth of cut, ap (mm) | 0.3 |
| Coolant: | Emulsion |

Result invention vs commercial reference leader
tool life invention=11 min (20% better than reference leader)

| Test 2 | |
|---|---|
| Machine: | Bermhel TFM125M |
| Work piece steel: | INCONEL 718 |
| Cutting speed Vc (m/min) = | 28 |
| Insert ref: | DCMT11T304-2M |
| Feed rate, (mm/rev) | 0.08 |
| Depth of cut, ap (mm) | 0.5 |
| Coolant: | Emulsion |

Result invention vs commercial reference leader=increase tool life by 35%

EXAMPLE 16

Inserts from Example 1 were tested and compared with inserts of a commercially available market reference (grade, coating, shape) for Turning-Semi finishing & Light Roughing of Stainless Steel

| Test 1 | |
|---|---|
| Machine: | WEISSER 1485 |
| Work piece steel: | DIN 1.4718 |
| Cutting speed Vc (m/min) | 130 |
| insert ref: | RNMG120400-11 |
| Feed rate, (mm/rev) | 0.3 |
| Depth of cut, ap (mm) | 0.5 |
| Coolant: | Emulsion |

Result invention vs commercial reference leader
480 parts machined (valves) with invention
150 parts machined with commercial reference leader

| Test 2 | |
|---|---|
| Machine: | HERNAUL SOMUA |
| Work piece steel: | X1NiCrMoCu22-24-6 (URANUS B66) |
| Cutting speed Vc (m/min) | 80 |
| Insert ref: | CNMG120412M5 |
| Feed rate, (mm/rev) | 0.2 |
| Depth of cut, ap (mm) | 4 |
| Coolant: | Emulsion |

Result invention vs commercial reference leader
2 parts machined with the invention
1 part machined with the commercial reference leader

| Test 3 | |
| --- | --- |
| Machine: | SOMAB Unimab 500 |
| Work piece steel: | 316LTi (interrupted cut) |
| Cutting speed Vc (m/min) | 70 |
| Insert ref: | CNMG120412M2 |
| Feed rate, (mm/rev) | 0.2 |
| Depth of cut, ap (mm) | 0.25 |
| Coolant: | Emulsion |

Result invention vs commercial reference leader
tool life invention=14 min (three times better than reference leader)

EXAMPLE 17

Inserts from Example 1 were tested and compared with inserts of a commercially available market reference (grade, coating, shape) for Turning-Semi finishing & Light Roughing of Cast Iron

| Test 1 | |
| --- | --- |
| Machine: | Nakamura |
| Work piece: | G25 (UNI 5007) |
| Cutting speed Vc (m/min) = | 300 |
| insert ref: | CNMA160612 |
| Feed rate, (mm/rev) | 0.5 |
| Depth of cut, ap (mm) | 4 |
| Coolant: | Emulsion |

Result invention vs commercial reference leader=Tool life increased by 20%

| Test 2 | |
| --- | --- |
| Machine: | Diedsheim |
| Work piece: | FGS50 (EN-GJS 5007) |
| Cutting speed Vc (m/min) = | 150 |
| Insert ref: | CNMG160616-7B |
| Feed rate, (mm/rev) | 0.5 |
| Depth of cut, ap(mm) | 3 |
| Coolant: | Emulsion |

Although the present invention has been described in connection with preferred embodiments thereof, it will be appreciated by those skilled in the art that additions, deletions, modifications, and substitutions not specifically described may be made without department from the spirit and scope of the invention as defined in the appended claims.

The invention claimed is:

1. Cemented carbide cutting tool insert comprising a substrate and a wear resistant coating wherein:
    the substrate comprises WC, from about 5.5 to about 8.5 wt-% Co and Cr such that the Cr/Co weight ratio is from about 0.08 to about 0.12, and also Ti and Ta in such amounts that the ratio of Me/Co=(at % Ti+at % Ta)/at % Co is less than or equal to about 0.014−(CW—Cr)*0.008 and higher than about 0.0005 and CW—Cr is from about 0.75 to about 0.95, whereby the CW—Cr is defined as CW—Cr=(magnetic-% Co+1.13*wt-% Cr)/wt-% Co where magnetic-% Co is the weight percentage of magnetic Co and wt-% Co is the weight percentage of Co in the cemented carbide, the coercivity is more than about 20 kA/m, and
    the wear resistant coating is a homogeneous $Al_xTi_{1-x}N$-layer where x equals from about 0.6 to about 0.67, with thickness of more than about 1 μm, but less than about 3.8 μm, both composition and thickness being measured on the flank face about 0.2 mm below the nose radius and in the center of the cutting edge.

2. The cemented carbide cutting tool insert of claim 1 wherein the substrate comprises from about 6 to about 8 wt-% Co, the Cr/Co weight ratio is from about 0.09 to about 0.11, the ratio of Me/Co is higher than about 0.0007, CW—Cr is from about 0.78 to about 0.93 and the coercivity is from about 23 to about 29 kA/m.

3. The cemented carbide cutting tool insert of claim 1 wherein in said coating, x is about 0.62 and the coating thickness is greater than about 1.0 μm but less than about 3.0 μm.

* * * * *